United States Patent
Schaellert et al.

(10) Patent No.: US 10,046,638 B2
(45) Date of Patent: Aug. 14, 2018

(54) ARRANGEMENT FOR OPENING AND CLOSING AN OPENING IN AN INTERIOR TRIM PIECE OF A VEHICLE

(71) Applicant: Volkswagen Aktiengesellschaft, Wolfsburg (DE)

(72) Inventors: Christoph Schaellert, Suepplingenburg (DE); Robert Mielke, Osnabrueck (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 51 days.

(21) Appl. No.: 15/397,072

(22) Filed: Jan. 3, 2017

(65) Prior Publication Data
US 2017/0113551 A1  Apr. 27, 2017

Related U.S. Application Data

(63) Continuation of application No. PCT/EP2015/059871, filed on May 5, 2015.

(30) Foreign Application Priority Data

Jul. 2, 2014 (DE) .......................... 10 2014 212 796

(51) Int. Cl.
*B62D 25/14* (2006.01)
*B60K 35/00* (2006.01)
(Continued)

(52) U.S. Cl.
CPC .............. *B60K 35/00* (2013.01); *B60K 37/00* (2013.01); *B60R 11/0235* (2013.01);
(Continued)

(58) Field of Classification Search
CPC ....... F16G 1/28; B60R 5/047; G01D 5/34738; A22C 11/08; A22C 7/0023;
(Continued)

(56) References Cited

U.S. PATENT DOCUMENTS 5,204,666 A * 4/1993 Aoki ...................... B60K 37/02
340/980
5,615,023 A   3/1997 Yang
(Continued)

FOREIGN PATENT DOCUMENTS

DE  44 45 555 A1   6/1995
DE  198 04 743 A1  8/1998
(Continued)

*Primary Examiner* — Kiran B Patel
(74) *Attorney, Agent, or Firm* — Muncy, Geissler, Olds & Lowe, P.C.

(57) ABSTRACT

An arrangement is provided for opening and closing an opening in a covering surface of an interior trim piece in a vehicle via an adjustable cover element. The cover element has two parallel, spaced-apart racks which extend in the adjusting direction of the cover element and each mesh with an associated toothed wheel. The toothed wheels are rotatably mounted on a frame element connected to the interior trim piece and are interlinked by a rotatingly driven shaft; at least one toothed wheel is connected to the shaft for conjoint rotation therewith. The cover element is adjustable relative to the frame element and thus to the opening as a result of a rotation of the toothed wheels that mesh with the racks. Preferably, the cover element slides under the covering surface of the interior trim piece, delimiting the opening, when the opening is opened.

11 Claims, 4 Drawing Sheets

(51) Int. Cl.
    *B60K 37/00*     (2006.01)
    *B60R 11/02*     (2006.01)
    *G02B 27/01*     (2006.01)
    *B60R 11/00*     (2006.01)

(52) U.S. Cl.
    CPC ..... *G02B 27/0101* (2013.01); *G02B 27/0149* (2013.01); *B60K 2350/1072* (2013.01); *B60K 2350/2052* (2013.01); *B60K 2350/405* (2013.01); *B60K 2350/406* (2013.01); *B60R 2011/0005* (2013.01); *B60R 2011/0082* (2013.01); *B60R 2011/0092* (2013.01); *B60R 2011/0094* (2013.01); *G02B 2027/0154* (2013.01)

(58) Field of Classification Search
    CPC ............ A61B 1/00142; A61B 1/00101; B65D 2577/205; G11B 23/08735; A47K 13/10
    USPC ......................................................... 296/70
    See application file for complete search history.

(56) References Cited

U.S. PATENT DOCUMENTS

| | | | |
|---|---|---|---|
| 6,012,785 A | | 1/2000 | Kawasaki |
| 6,131,242 A | * | 10/2000 | Zipperle ................ B60N 3/083 16/82 |
| 6,542,305 B2 | | 4/2003 | Nakamura et al. |
| 6,580,562 B2 | | 6/2003 | Aoki et al. |
| 8,072,743 B2 | * | 12/2011 | Kissel ................ B60R 11/0235 224/483 |
| 8,328,265 B2 | | 12/2012 | Danz et al. |
| 8,454,073 B2 | * | 6/2013 | Grandel ............. B60R 11/0235 296/37.12 |
| 8,794,473 B2 | * | 8/2014 | Kang ..................... B60R 7/04 220/326 |
| 9,470,892 B2 | * | 10/2016 | Killguss ............... G02B 7/1827 |
| 9,778,463 B2 | * | 10/2017 | Chien ................. G02B 27/0149 |
| 9,844,994 B2 | * | 12/2017 | Byon .................. B60H 1/00035 |
| 2002/0101091 A1 | * | 8/2002 | Ito ....................... B60R 11/0235 296/37.12 |
| 2003/0128103 A1 | | 7/2003 | Fitzpatrick et al. |
| 2003/0178434 A1 | | 9/2003 | Kato |
| 2007/0119852 A1 | * | 5/2007 | Matsunaga ............... B60R 7/06 220/200 |
| 2008/0049331 A1 | | 2/2008 | Nakamura et al. |
| 2008/0143120 A1 | * | 6/2008 | Lee ......................... B60N 3/083 292/1 |
| 2012/0180393 A1 | * | 7/2012 | Suzuki ............... B60H 1/00692 49/348 |
| 2015/0055098 A1 | * | 2/2015 | Ishibashi ................ B60K 35/00 353/14 |
| 2015/0283873 A1 | * | 10/2015 | Suzuki ..................... F24F 13/10 165/202 |
| 2016/0299343 A1 | * | 10/2016 | Chien ................. G02B 27/0149 |
| 2017/0139208 A1 | * | 5/2017 | Chien ................. G02B 27/0149 |

FOREIGN PATENT DOCUMENTS

| | | |
|---|---|---|
| DE | 200 15 730 U1 | 1/2002 |
| DE | 101 35 986 A1 | 2/2002 |
| DE | 102 20 180 A1 | 11/2002 |
| DE | 10 2006 020 264 A1 | 11/2007 |
| DE | 10 2006 039 021 A1 | 2/2008 |
| DE | 10 2006 042 595 A1 | 3/2008 |
| DE | 10 2006 053 049 A1 | 5/2008 |
| DE | 10 2007 035 255 B4 | 12/2010 |
| DE | 10 2011 106 053 A1 | 1/2013 |
| DE | 10 2011 109 056 A1 | 1/2013 |
| DE | 10 2014 100 466 U1 | 4/2014 |
| JP | H04 90934 A | 3/1992 |
| JP | H 10-271413 A | 10/1998 |
| JP | 2005 335582 A | 12/2005 |
| JP | 2008 302715 A | 12/2008 |
| JP | 2012-061987 A | 3/2012 |

* cited by examiner

ARRANGEMENT FOR OPENING AND CLOSING AN OPENING IN AN INTERIOR TRIM PIECE OF A VEHICLE

This nonprovisional application is a continuation of International Application No. PCT/EP2015/059871, which was filed on May 5, 2015, and which claims priority to German Patent Application No. 10 2014 212 796.3, which was filed in Germany on Jul. 2, 2014, and which are both herein incorporated by reference.

BACKGROUND OF THE INVENTION

Field of the Invention

The invention relates to an arrangement for opening and closing an opening in an interior trim piece of a vehicle, in particular a motor vehicle.

Description of the Background Art

Positioning mechanisms for a vehicle display device disposed in an instrument panel, such as a navigation system, a TV set, or the like are known from DE 198 04 743 A1, which corresponds to U.S. Pat. No. 6,012,785. Thus, according to a first embodiment, the display device is guided slidably by means of pins, arranged at one end, in so-called cam grooves of a case accommodating the display device. When the pins are moved back and forth along the cam grooves, the display device can be moved between a lying and a standing or upright state, whereby in the upright state an opening in the case is passed through, which can be closed by a pivotable cover. The cover is opened during the opening process by the display device. The pins are to be coupled to a motor via a rack and pinion mechanism. A rotating motion of the motor is to be converted by the rack and pinion mechanism in a straight reciprocating motion, so that the pins can slide. This publication remains silent as to the details on how the rack and pinion mechanism is to be made. According to a second embodiment of the display device, it is provided that the display device is guided slidably likewise by pins, arranged at one end, in cam grooves and thus can be flipped up or down. In this case, on the bottom surface of a case receiving the display device a right and left rack is provided, on which a block can be moved by a left and right toothed wheel in a motor driven manner along the racks. The motor is disposed in the block. The pins of the display device are guided both in the cam grooves of the block and in the cam grooves of the case such that due to a motion of the block and with the aid of links the display device is placed in the standing or lying state.

DE 102 20 180 A1, which corresponds to U.S. Pat. No. 6,542,305, describes a cover unit opening and closing an opening in a vehicle for a head-up display, whereby the opening allows the beams of an image emitted from a displaying device to reach a screen, for example, the windshield of the vehicle. The cover unit comprises an intercepting plate to interrupt or pass through the geometric beam path from the displaying device to the screen or to the windshield. The intercepting plate can be moved between a standing and lying position by means of a motor-driven swing and/or lever mechanism.

SUMMARY OF THE INVENTION

It is therefore an object of the invention to provide an alternative arrangement to the prior art for opening and closing an opening in an interior trim piece of a vehicle, which is simple and cost-effective.

For the purposes of the present description, the conventional direction of travel of a vehicle can be designated by "−x" ("minus x"), the direction opposite to its conventional direction of travel by "+x" ("plus x"), based on the conventional direction of travel (−x) the direction horizontally transverse to the x-direction to the right by "+y," based on the conventional direction of travel (−x) the direction horizontally transverse to the x-direction to the left by "−y," the direction vertically transverse to the x-direction upwards by "+z," and the direction vertically transverse to the x-direction downwards by "−z." This terminology for the spatial directions in Cartesian coordinates corresponds to the coordinate system generally used in the automotive industry. Moreover, terms such as "before," "behind," "above", "below", as well as terms with a similar meaning including the terms "right" and "left" are used in the way they are typically used to designate directions for a motor vehicle.

Proceeding from an arrangement for opening and closing an opening provided in a covering surface of an interior trim piece in a vehicle, in particular a motor vehicle, by means of an adjustable cover element, whereby the cover element is formed by a flat element and can be moved from a closed position, in which the cover element covers the opening, to an open position, in which the cover element opens the opening by movement of the same, and back, an object is achieved in that the cover element has two parallel, spaced-apart racks which extend in the adjusting direction of the cover element and each meshes with an associated toothed wheel, whereby the toothed wheels are rotatably mounted on a frame element, connected to the interior trim piece, and are interlinked by rotatingly driven shaft, whereby at least one toothed wheel is connected to the shaft for conjoint rotation therewith, and whereby the cover element is adjustable relative to the frame element and thus to the opening as a result of a rotation of the toothed wheels that mesh with the racks.

Advantageously, the opening and closing of the opening is brought about solely by the adjusting movement of the racks with the cover element attached thereto on the toothed wheels.

The cover element is adapted to slide under the covering surface of the interior trim piece, delimiting the opening, when the opening is opened. An upward movement of the cover element by means of complicated lever actions to open the opening, as is favored in the prior art, is then unnecessary in the present case, because the cover element during the opening process slides under the covering surface of the interior trim piece and moves at least in sections as it were parallel or largely parallel to the covering surface and accordingly in the opened state of the opening contrary to the prior art does not rise above the covering surface of the interior trim piece.

According to an embodiment of the invention, the racks have a congruent rolling contour, rolling on the toothed wheels and in each case being formed by a first straight rack section, which changes into a second curved rack section formed by a sector of an internally toothed spur wheel. The selected rolling contour of the racks predefines a travel path of the cover element or a curve that describes the cover element when the opening is opened and closed. According to a second advantageous embodiment variant, it is provided that the racks have a congruent rolling contour, rolling on the toothed wheels and in each case formed by a first curved rack section, which is formed by a sector of an internally wheeled spur wheel and changes into a second curved rack section, formed by a sector of an internally toothed spur wheel, whereby the pitch circle diameter of the first rack section is selected to be much greater than the pitch circle diameter of the second rack section. This second embodiment variant differs substantially from the first embodiment variant in that the first straight rack section is now replaced by a curved, in particular only slightly curved first rack section. A travel path or a curve of the cover element, which is matched even better to the contour of the covering surface, delimiting the opening, of the interior trim piece when the opening is opened and closed, can be represented advantageously by this measure. In particular the installation space necessary for the cover element to travel under interior trim piece can therefore also be reduced in an advantageous manner.

The rack sections can be arranged on the cover element such that in the closed position of the cover element the second rack section is engaged with the toothed wheel, whereas in the open position of the cover element the first rack section is engaged with the toothed wheel. To assure secure guiding of the cover element during the opening and closing process, a front and rear guide pin, when viewed in the adjusting direction of the cover element, are arranged bilaterally on the same, which guide pins are positively guided slidably in a guide groove of the frame element. The guide groove in this case is formed by a front guide groove section, associated with the front guide pin, and a rear guide groove section, associated with the rear guide pin. Expediently, in this case the guide groove sections can be formed on each side separated from one another to allow a largely independent design of the guide groove sections depending on the selected travel path of the cover element. Preferably the guide groove sections on each side have such a course that proceeding from the closed position of the cover element, during the opening process it is first tilted on the toothed wheel side by a specific angle "α" toward the toothed wheel and guided obliquely in the toothed wheel direction and lastly taken along a straight line or nearly straight line. At the start of the opening process, the cover element then slides as it were under the covering surface, delimiting the opening, of the interior trim piece. So as to minimize even further the installation space necessary for assuring the movement of the cover element, it is provided in an improvement of the invention that on each side the guide groove sections have such a course that the end of the cover element, the end now facing the toothed wheel in the open position of the cover element, is inclined at a specific angle "β" to the straight line. Thus, depending on the contour curve of the covering surface of the interior trim piece, this end can be inclined, for example, upward or downward by the angle "β."

The arrangement of the invention is suitable, for example, for installation in an interior trim piece in the form of an instrument panel of the vehicle so as to cover, for example, a head-up display. A head-up display is understood to be an information display system in which the information is projected out of the instrument panel and through an opening in the same into the field of view of the vehicle driver, for example, onto a windshield of the vehicle or onto a separate combiner plate of the head-up display. In the present case, the opening is closed by the cover element, when the combiner plate is retracted, or opened when the combiner plate is extended. A combiner plate in this case is understood to be a partially reflective, light-transmitting plate.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
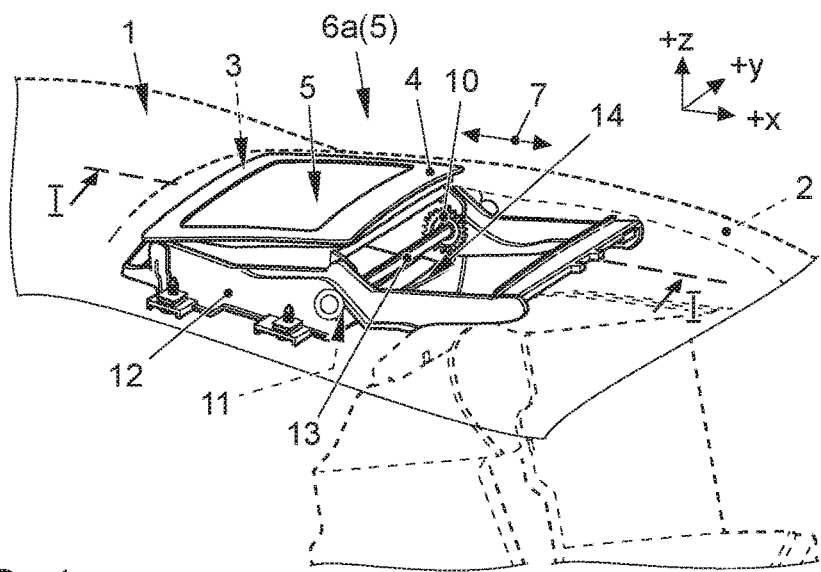
FIG. 1 shows a perspective view of an interior trim piece of a vehicle with the arrangement of the invention for opening and closing an opening in the interior trim piece.

FIG. 1 shows first a relevant section of an interior trim piece 1, in the present case by way of example an instrument panel of a vehicle, in particular a motor vehicle (not illustrated). Interior trim piece 1 in a horizontal or largely horizontal upper covering surface 2 has an opening 3, which for its part is covered by a transparent protective cover 4 supported on covering surface 2.

According to this exemplary embodiment, the opening 3 assures the geometric beam path of light beams produced by a head-up display (not illustrated). As already stated above, a head-up display is understood to be an information display system in which the information is projected out of interior trim piece 1 or the instrument panel of the vehicle and through opening 3 in the same into the field of vision of the vehicle driver, for example, onto a windshield of the vehicle or onto a separate so-called combiner plate of the head-up display. Opening 3 can be opened or closed by an adjustable cover element 5 (not illustrated).

The cover element 5 is formed by a flat element and can be moved from a closed position 6a, in which cover element 5 covers the opening 3 (cf. in particular FIGS. 1, 2, 4a, and 5), to an open position 6b, in which cover element 5 opens opening 3 by adjustment of the cover element (cf. in particular FIGS. 4b-d, 6, and 7), and back. Cover element 5 in the present case can be adjusted such that during the opening process (cf. in particular FIGS. 4b-d, 6, and 7) it travels as it were along opening 3 and under covering surface 2, delimiting opening 3, of interior trim piece 1 and accordingly in the opened state of opening 3 does not rise above covering surface 2 of interior trim piece 1. In this case, cover element 5 can travel at least in sections parallel or largely parallel to the covering surface 2.

Cover element 5 on its side facing away from covering surface 2 of interior trim piece 1 has two parallel, spaced-apart racks 8, 9 which extend in adjusting direction 7 of the cover element. The adjusting direction 7 according to this exemplary embodiment extends in the longitudinal direction (±x-direction) of the vehicle. Racks 8, 9 for their part each mesh with an associated toothed wheel 10, 11. Toothed wheels 10, 11 are rotatably mounted on a frame element 12 connected to interior trim piece 1 and arranged below covering surface 2 of the same (FIGS. 1-7). Further, toothed wheels 10, 11 are interlinked by a rotatingly driven shaft 13, whereby at least one of toothed wheels 10, 11, but preferably both toothed wheels 10, 11, are connected to shaft 13 for conjoint rotation therewith. Shaft 13 and toothed wheels 10, 11 are rotatingly driven by an electric motor 14, which for its part is attached fixedly to frame element 12 (FIGS. 1, 5-7). As a result of a rotational movement of toothed wheels 10, 11, meshing with racks 8, 9, cover element 5 is adjustable relative to frame element 12 and accordingly to opening 3 in the present longitudinal direction (±x-direction) of the vehicle.

Figure 2:
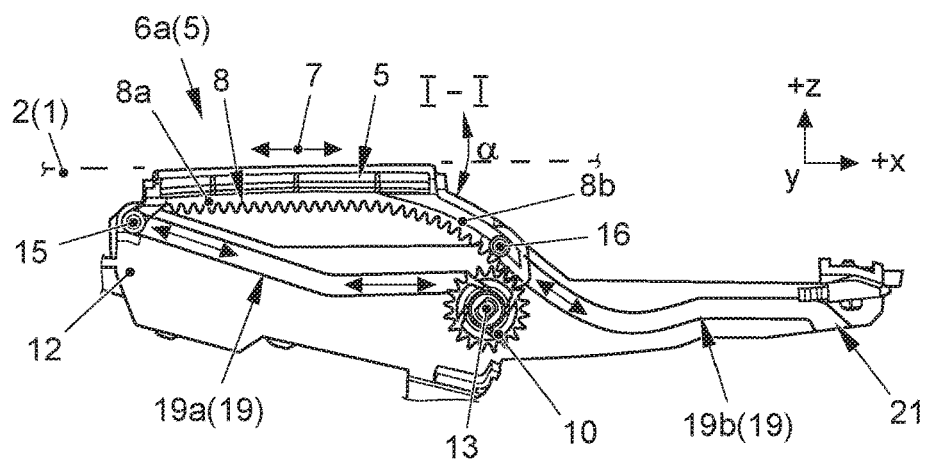
FIG. 2 shows the arrangement in a sectional view with a cover element mounted adjustably on a frame element (section line I-I in FIG. 1)
Figure 3:
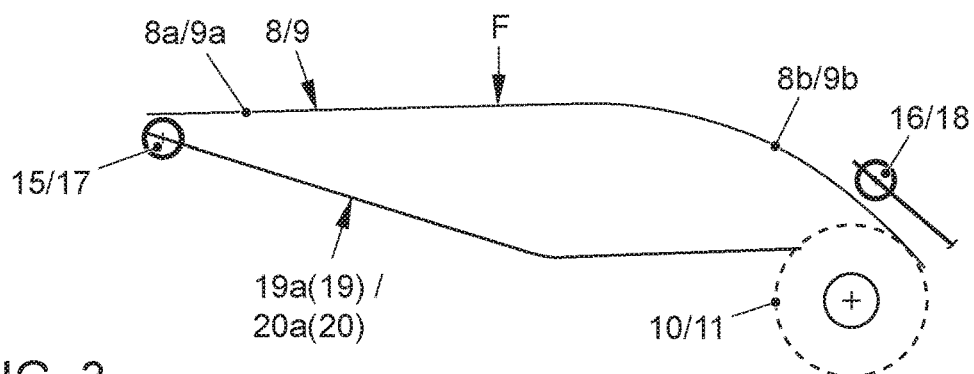
FIG. 3 shows a schematic illustration of a rack and guide groove contour of the cover element.

As illustrated in FIGS. 2-7, racks 8, 9 according to an embodiment of the invention have a congruent rolling contour, rolling on toothed wheels 10, 11 and formed by a first straight rack section 8a, 9a, which changes into a second curved rack section 8b, 9b, formed by a sector of an internally toothed spur wheel (cf. in particular FIG. 2). The selected rolling contour of racks 8, 9 predefines a travel path of cover element 5 or a curve that describes cover element 5 during the opening and closing of the opening. In the present case, rack sections 8a, 8b, 9a, 9b are arranged on cover element 5 such that in closed position 6a (FIGS. 1-3, 4a, and 5) of cover element 5, second rack section 8b, 9b is engaged with toothed wheel 10, 11, whereas in open position 6b (FIGS. 4d and 7) of cover element 5, first rack section 8a, 9a is engaged with toothed wheel 10, 11.

To assure a secure guiding of cover element 5 during the opening and closing process, one front and one rear guide pin 15, 16; 17, 18 when viewed in adjusting direction 7 of cover element 5 are arranged bilaterally on the same. Guide pins 15, 16; 17, 18 on each side are positively guided slidably in an associated guide groove 19, 20 of frame element 12. Guide groove 19, 20 in this case can be formed continuous and receive both the front and rear guide pins 15, 16; 17, 18 on each side (not illustrated). Preferably, however, guide grooves 19, 20 form front and rear guide groove sections 19a, 19b; 20a; 20b, which are separated from one another (cf. in particular FIG. 2). In this regard, front guide pins 15, 17 are associated with front guide groove sections 19a, 20a and rear guide pins 16, 18 with rear guide groove sections 19b, 20b.

Guide groove sections 19a, 19b; 20a, 20b on each side have such a course that proceeding from the closed position 6a of cover element 5 during the opening process it is tilted initially on the toothed wheel side by a specific angle "α" toward toothed wheel 10, 11 and guided obliquely in the direction of toothed wheel 10, 11 and lastly is moved along a straight line or virtually straight line (FIG. 2). The straight line in the present case is understood to be a straight section of the course, which runs horizontally or nearly horizontally and/or parallel or nearly parallel to covering surface 2 of interior trim piece 1.

Front guide groove sections 19a, 20a in this respect proceeding from the opening 3 toward the back of the vehicle have an oblique course downward, which changes into a straight, particularly horizontal or nearly horizontal or parallel or nearly parallel course to covering surface 2. Rear guide groove sections 19b, 20b also extend initially obliquely downward to then change into a straight line or nearly straight line as defined above. The angle "α" results substantially from the oblique course of guide groove sections 19a, 19b, 20a, 20b and from the selected pitch circle diameter of second curved rack section 8b9b, formed by a sector of an internally toothed spur wheel. As a result, as it were, at the start of the opening process, cover element 5 slides under covering surface 2, delimiting the opening, of interior trim piece 1 and is then taken further under the covering surface 2.

In short, the second curved rack section 8b, 9b in combination with the slanting of guide groove sections 19a, 19b; 20a, 20b provides for the sliding under of cover element 5 at the start of the opening process. This movement downward decreases over the course of the travel path, so that cover element 5, after it has been lowered and first straight rack section 8a, 9b is engaged with toothed wheels 8, 9, moves without being further lowered. Preferably, the inclination of front guide section 19a, 20a is selected or set such that a yielding of cover element 5 upon outer (improper) stress "F" is prevented but is at least effectively prevented (cf. FIG. 3). This inclination should therefore not be made too steep. Moreover, this yielding of cover element 5 can also be prevented but at least effectively prevented by the selected gear ratio of the motor drive.

Figure 4A:
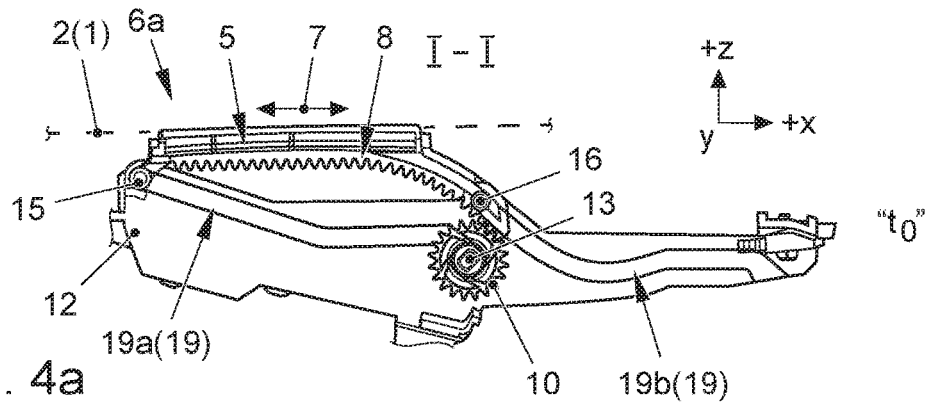
FIGS. 4a-d show the cover element in four different adjustment positions during the opening of the opening in the interior trim piece.
Figure 4B:
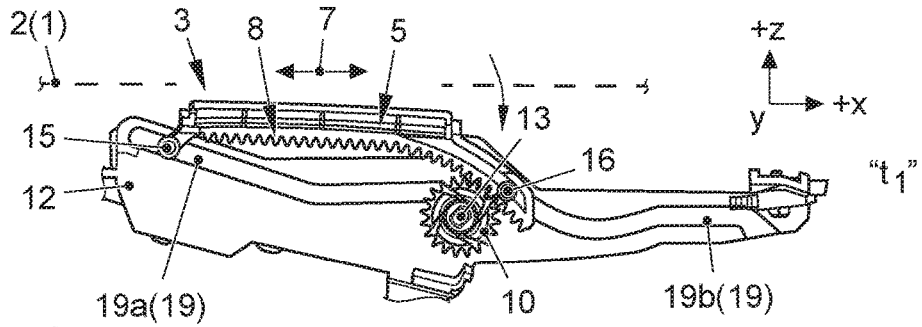
Figure 4C:
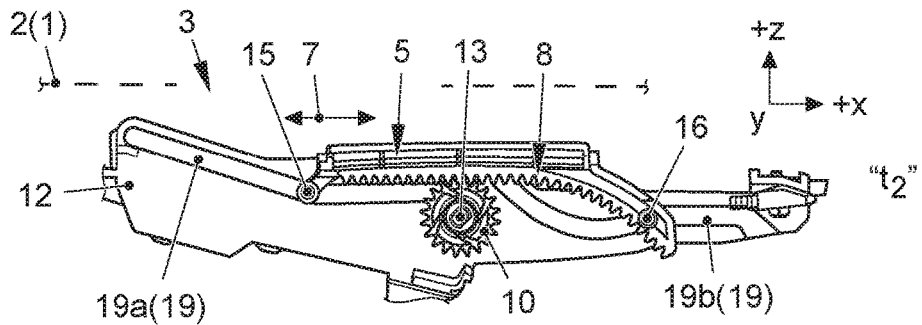
Figure 4D:
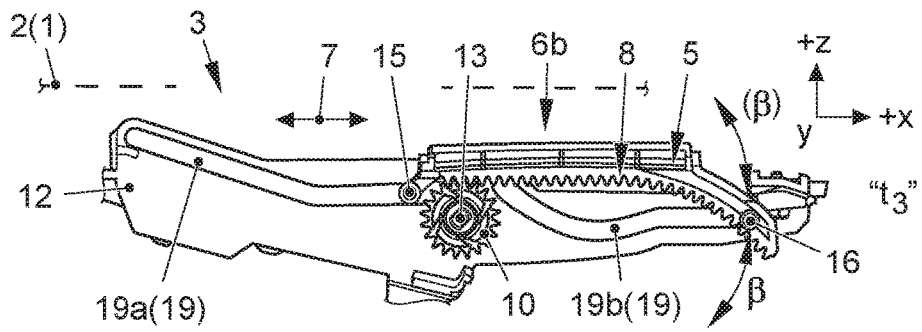
Figure 5:
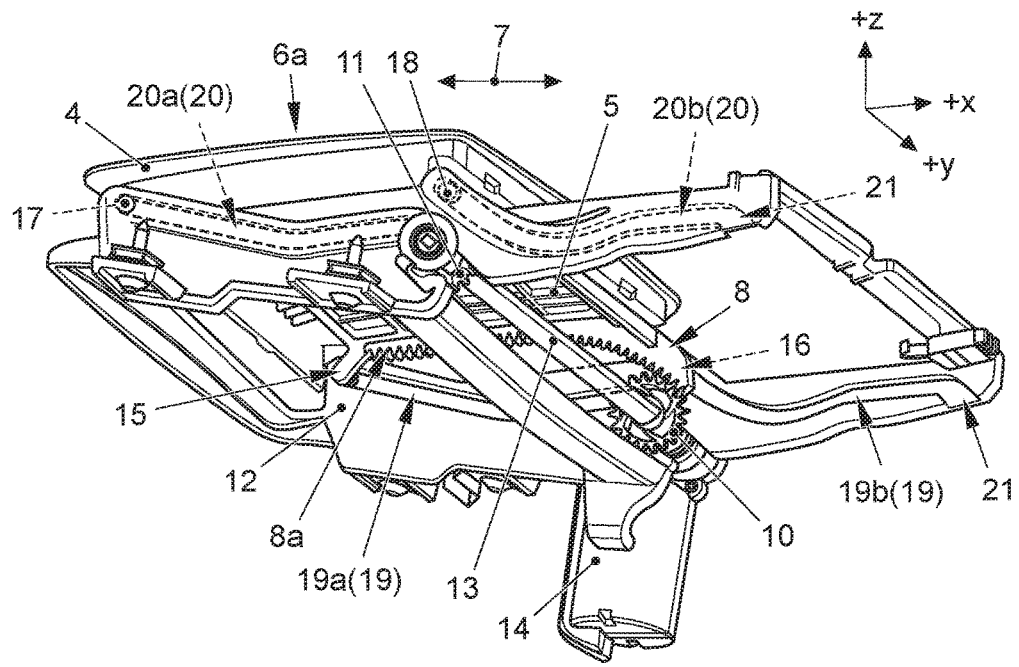
FIG. 5 shows a perspective illustration of the cover element corresponding to the adjustment position according to FIG. 4a (closed position)
Figure 6:
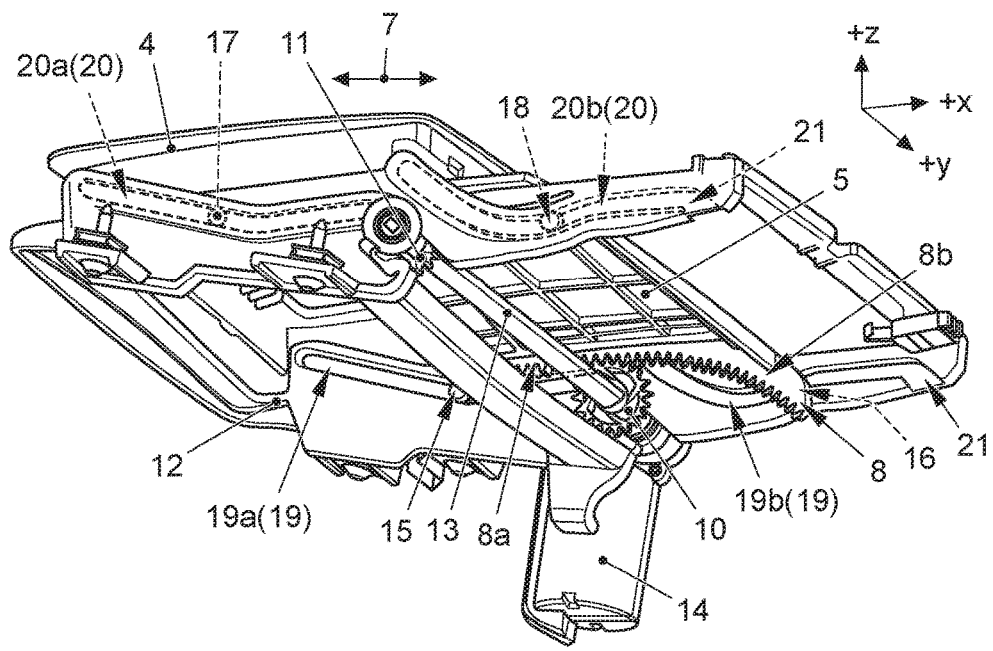
FIG. 6 shows a perspective illustration of the cover element corresponding to the adjustment position according to FIG. 4c (intermediate position)
Figure 7:
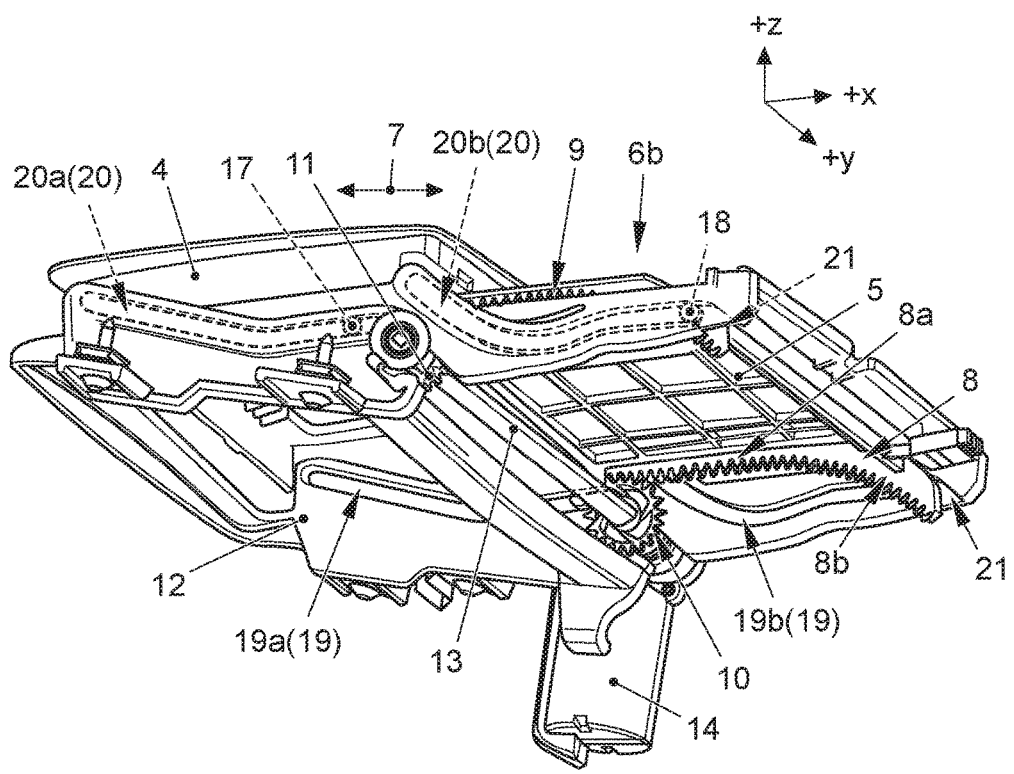
FIG. 7 shows a perspective illustration of the cover element corresponding to the adjustment position according to FIG. 4d (closed position).

To minimize still further the installation space necessary for assuring the movement of cover element 5, it is provided in an improvement of the invention that on each side guide groove sections 19, 20, in the present case rear ends 21 of rear guide groove sections 19b, 20b, have a course such that in open position 6b of cover element 5 the end, facing away from toothed wheel 9, 10, of cover element 5 is now inclined by a specific angle "β" to the straight line. Thus, this end of cover element 5 depending on the contour course of covering surface 2 of interior trim piece 1 can be inclined, for example, upward or downward by the angle "β" (FIG. 4d). According to this exemplary embodiment, the rear ends 21 of rear guide groove sections 19b, 20b run downward, as a result of which in open position 6b of cover element 5 the end, facing away from toothed wheel 9, 10, of cover element 5 is inclined downward by a specific angle "β" to the straight line (FIG. 2).

FIGS. 4a-4d and 5-7 show the arrangement of the invention in operation. According to FIGS. 4a and 5, cover element 5 at a time "$t_0$" is in its closed position 6a. Even if cover element 5 is to be moved to its open position 6b (FIG. 4d), toothed wheels 8, 9 are rotatingly driven by electric motor 14 (not shown here) such that cover element 5 by means of its racks 8, 9 and positively guided in guide grooves 19, 20 is adjusted or taken in the direction of the open position, i.e., according to FIGS. 4a-4d from the left to the right. The travel path of cover element 5 is predefined by the course of guide grooves 19, 20 or their guide groove sections 19a, 19b; 20a, 20b and the rolling contour of the above-described racks 8, 9 or their rack sections 8a, 8b; 9a, 9b. According to FIG. 4b, therefore cover element 5 at a time "$t_1$" slides under covering surface 2 of interior trim piece 1, the covering surface being indicated here only schematically by a broken line. According to FIGS. 4c and 6 at a time "$t_2$" cover element 5 is guided on a straight line or nearly straight line, which in the present case runs parallel or nearly parallel to covering surface 2. Lastly, according to FIGS. 4d and 7 at a time "$t_3$" cover element 5 reaches its open position 6b, whereby its end, facing away from toothed wheel 9, 10, is inclined optionally either upward or downward to the straight line by a specific angle "β".

According to an embodiment of the invention, it is provided that racks 8, 9 have a congruent rolling contour, which rolls on wheeled teeth 10, 11 and in each case is formed by a first curved rack section 8a, 9a, which is formed by a sector of an internally toothed spur wheel and changes into a second curved rack section 8b, 9b formed by a sector of an internally toothed spur wheel. In this regard, the pitch circle diameter of first rack section 8a, 9a is selected to be much greater than the pitch circle diameter of second rack section 8b, 9b. This embodiment variant differs in that the first rack section 8a, 9a, which is straight according to the embodiment, is now replaced by a curved, preferably only slightly curved, first rack section 8a, 9a. In other words, the pitch circle diameter of first rack section 8a, 9a can be selected, for example, to be so large that a nearly straight first rack section 8a, 9a is formed. A travel path or a curve of cover element 5 can be represented advantageously by this measure, which path during the opening and closing of opening 3 is matched even better to the contour of covering surface 2, delimiting opening 3, of interior trim piece 1. This results in an advantageous manner also in particular in a reduction of the installation space necessary for sliding cover element 5 under interior trim piece 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement for opening and closing an opening provided in a covering surface of an interior trim piece in a vehicle, in particular a motor vehicle, the arrangement comprising:
    an adjustable cover element formed by a flat element and being movable from a closed position, in which the cover element covers the opening, to an open position, in which the cover element opens the opening by movement of the same in reverse; and
    two parallel, spaced-apart racks arranged on the adjustable cover element that extend in an adjusting direction of the cover element and each mesh with an associated toothed wheel,
    wherein the toothed wheels are rotatably mounted on a frame element, connected to an interior trim piece and are interlinked by a rotatingly driven shaft,
    wherein at least one toothed wheel is connected to the shaft for conjoint rotation therewith, and
    wherein the cover element is adjustable relative to the frame element and thus to the opening as a result of a rotation of the toothed wheels that mesh with the racks.

2. The arrangement according to claim 1, wherein the cover element slides under the covering surface delimiting the opening of the interior trim piece when the opening is opened.

3. The arrangement according to claim 1, wherein the racks have a congruent rolling contour, rolling on toothed wheels, and wherein the rolling contour either:
    is formed by a first straight rack section, which changes into a second curved rack section formed by a sector of an internally toothed spur wheel, or
    is formed by a first curved rack section, which is formed by a sector of an internally toothed spur wheel and changes into a second curved rack section, formed by a sector of an internally toothed spur wheel, wherein a pitch circle diameter of the first rack section is selected to be greater than a pitch circle diameter of the second rack section.

4. The arrangement according to claim 3, wherein the rack sections are arranged on the cover element such that in the closed position of the cover element the second rack section is engaged with the toothed wheel, whereas in the open position of the cover element the first rack section is engaged with the toothed wheel.

5. The arrangement according to claim 1, wherein a front and rear guide pin each, when viewed in the adjusting direction of the cover element, are arranged bilaterally on the same, which guide pins are positively guided slidably in a guide groove of the frame element.

6. The arrangement according to claim 5, wherein the guide groove is formed by a front and rear guide groove section.

7. The arrangement according to claim 6, wherein the guide groove sections are formed on each side separated from one another.

8. The arrangement according to claim 7, wherein the guide groove sections on each side have such a course that proceeding from the closed position of the cover element, during the opening process it is first tilted on the toothed wheel side by a specific angle "α" toward the toothed wheel and guided obliquely in a direction of toothed wheel and lastly taken along a straight line or a substantially straight line.

9. The arrangement according to claim 8, wherein on each side the guide groove sections have such a course that the end of the cover element, the end now facing the toothed wheel in the open position of the cover element, is inclined by a specific angle "β" to the straight line.

10. The arrangement according to claim 1, wherein the interior trim piece is an instrument panel of the vehicle.

11. The arrangement according to claim 1, wherein the arrangement is adapted to cover a head-up display.

* * * * *